US012581423B2

(12) United States Patent
    Guo

(10) Patent No.: US 12,581,423 B2
(45) Date of Patent: Mar. 17, 2026

(54) METHOD FOR POWER CONTROL, AND COMMUNICATION DEVICE

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 314 days.

(21) Appl. No.: 18/258,774

(22) PCT Filed: Dec. 22, 2020

(86) PCT No.: PCT/CN2020/138201
    § 371 (c)(1),
    (2) Date: Jun. 21, 2023

(87) PCT Pub. No.: WO2022/133699
    PCT Pub. Date: Jun. 30, 2022

(65) Prior Publication Data
    US 2024/0049141 A1      Feb. 8, 2024

(51) Int. Cl.
    *H04W 52/14*          (2009.01)
    *H04W 52/36*          (2009.01)

(52) U.S. Cl.
    CPC ....... *H04W 52/146* (2013.01); *H04W 52/365* (2013.01)

(58) Field of Classification Search
    CPC ............. H04W 52/146; H04W 52/367; H04W 52/365; H04W 52/34; H04W 24/10; H04W 52/54; H04W 52/243; H04W 52/42; H04W 88/02; H04W 52/242; H04W 52/325; H04W 52/346; H04W 88/06; H04W 16/28; H04W 52/18; H04W 52/36; H04W 52/545; H04W 72/20; H04W 88/10; H04W 52/283; H04W 52/288; H04W 72/23; H04W 76/27; H04W 48/12
    See application file for complete search history.

(56) References Cited

U.S. PATENT DOCUMENTS 12,342,288 B2 * 6/2025 Zhao ................... H04W 52/146
2012/0207112 A1     8/2012 Kim et al.
                   (Continued)

FOREIGN PATENT DOCUMENTS

CN          102934499 A     2/2013
CN          107105495 A     8/2017
                   (Continued)

OTHER PUBLICATIONS

Office Action issued Apr. 27, 2024, in corresponding Chinese Patent Application No. 2020800099.6, 5 pages.
                   (Continued)

*Primary Examiner* — Golam Sorowar
(74) *Attorney, Agent, or Firm* — Oblon, McClelland, Maier & Neustadt, L.L.P.

(57) ABSTRACT

A method for power control, including: receiving, by a base station, indication information sent by a terminal based on a maximum allowable power reduction (P-MPR); and determining control information for regulating and controlling uplink transmission of the terminal according to the indication information.

16 Claims, 7 Drawing Sheets

Terminal                                    Base station

S101, receiving indication information sent by a terminal based on a P-MPR

S102, determining control information for regulating and controlling uplink transmission of the terminal according to the indication information

(56) References Cited

U.S. PATENT DOCUMENTS

| | | | | |
|---|---|---|---|---|
| 2013/0301537 A1* | 11/2013 | Lee | .................... | H04W 52/243 |
| | | | | 370/328 |
| 2015/0195795 A1 | 7/2015 | Loehr et al. | | |
| 2020/0084730 A1* | 3/2020 | Ji | ........................ | H04W 52/241 |
| 2022/0116891 A1* | 4/2022 | Yao | ........................ | H04W 52/42 |
| 2022/0377680 A1* | 11/2022 | Yuan | .................. | H04W 52/367 |
| 2023/0043225 A1* | 2/2023 | Hong | .................. | H04W 52/365 |
| 2023/0156627 A1* | 5/2023 | Yuan | .................. | H04W 52/365 |
| | | | | 370/318 |
| 2023/0156631 A1* | 5/2023 | Yang | .................. | H04W 52/365 |
| | | | | 370/318 |

FOREIGN PATENT DOCUMENTS

| | | | |
|---|---|---|---|
| CN | 108702761 A | 10/2018 |
| CN | 110536400 A | 12/2019 |
| CN | 111279758 A | 6/2020 |
| CN | 111436105 A | 7/2020 |

OTHER PUBLICATIONS

Combined Chinese Office Action and Search Report issued Oct. 19, 2023 in Chinese Application 202080004099.6, (with English translation), 11 pages.

"Further considerations on the uplink duty cycle enhancements for the MPE scenario", 3GPP RAN WG4 Meeting #92bis R4-1911505, Oct. 14-18, 2019, 9 pages.

"MPR for high power/high duty cycle transmission", 3GPP TSG-RAN WG4 #88bis, R4-1812409, Oct. 8-12, 2018, 2 pages.

3rd Generation Partnership Project; Technical Specification Group Radio Access Network; NR; User Equipment (UE) radio transmission and reception; Part 1: Range 1 Standalone (Release 18), 3GPP TS 38.101-1 V18.1.0 (Mar. 2023), 753 pages.

3rd Generation Partnership Project; Technical Specification Group Radio Access Network; NR; Radio Resource Control (RRC) protocol specification (Release 17), 3GPP TS 38.331 V17.4.0 (Mar. 2023), 1321 pages.

International Search Report with English Translation mailed on Sep. 6, 2021 in PCT/CN2020/138201 filed on Dec. 22, 2020 (2 pages).

First Chinese Office Action dated May 25, 2023 in Chinese Application 202080004099.6 (5 pages).

* cited by examiner

S201

METHOD FOR POWER CONTROL, AND COMMUNICATION DEVICE

CROSS-REFERENCE TO RELATED APPLICATIONS

The present application is a U.S. National Stage of International Application No. PCT/CN2020/138201, filed on Dec. 22, 2020, all contents of which are incorporated herein by reference in their entireties for all purposes.

TECHNICAL FIELD

Embodiments of the present disclosure relate to the field of wireless communications, but are not limited to the field of wireless communications, and particularly, to a method and apparatus for power control, a communication device, and a storage medium.

BACKGROUND

Electromagnetic radiation of a mobile terminal device such as a mobile phone, a smart watch, and a computer may affect the safety of the human body. Especially along with the commercial use of 5G NR (5 Generation New Radio, Fifth Generation Communication New Air Interface Technology), the terminal supporting high frequency band and high power will become a mainstream in the market, which also objectively increases the risk of electromagnetic radiation of the terminal device on the safety of the human body.

SUMMARY

According to a first aspect of the embodiments of the present disclosure, there is provided a method for power control, where the method includes:

receiving, by a base station, indication information sent by a terminal based on a P-MPR (Maximum Allowed UE Output Power Reduction); and determining control information for regulating and controlling uplink transmission of the terminal according to the indication information.

According to a second aspect of the embodiments of the present disclosure, there is provided a method for power control, where the method includes:

sending, by a terminal, indication information according to a P-MPR of the terminal;

performing uplink transmission according to control information determined by a base station based on the indication information for regulating and controlling the uplink transmission of the terminal.

According to a third aspect of the embodiments of the present disclosure, there is provided a communication device, and the communication device at least includes a processor, and a memory for storing an executable instruction capable of running on the processor, where, when the processor is configured to run the executable instruction, the executable instruction executes the steps in any one of the methods for power control described above.

BRIEF DESCRIPTION OF THE DRAWINGS

The accompanying drawings, which are incorporated in and constitute a part of the description, illustrate embodiments consistent with the present disclosure and, together with the description, serve to explain the principles of the embodiments of the present disclosure.

DETAILED DESCRIPTION

Embodiments will be described in detail here, examples of which are illustrated in the accompanying drawings. The following description refers to the accompanying drawings in which the same numbers in different drawings represent the same or similar elements unless otherwise represented. The implementations described in the following embodiments do not represent all implementations consistent with the embodiments of the present disclosure. By contrast, they are merely examples of apparatuses and methods consistent with some aspects of the present disclosure as detailed in the appended claims.

The terms used in the embodiments of the present disclosure are for the purpose of describing particular embodiments only and are not intended to limit the embodiments of the present disclosure. As used in the embodiments of the present disclosure and the appended claims, the singular forms "a" and "the" are also intended to include the multiple form unless the context clearly indicates other meanings. It should also be understood that the term "and/or" as used here refers to and includes any or all possible combinations of one or more associated listed items.

It should be understood that although the terms first, second, third, etc., may be used in the embodiments of the present disclosure to describe various information, this information should not be limited to these terms. These terms are only used to distinguish the same type of information from each other. For example, without departing from the scope of the embodiments of the present disclosure, the first information may also be referred to as second information, and similarly, the second information may also be referred to as first information. Depending on the context, the words "if" and "in case" as used here may be interpreted as "on the time" or "when" or "in response to determining".

In order to better describe any embodiment of the present disclosure, an example description is made by taking an application scene of access control as an example in an embodiment of the present disclosure.

Figure 1:
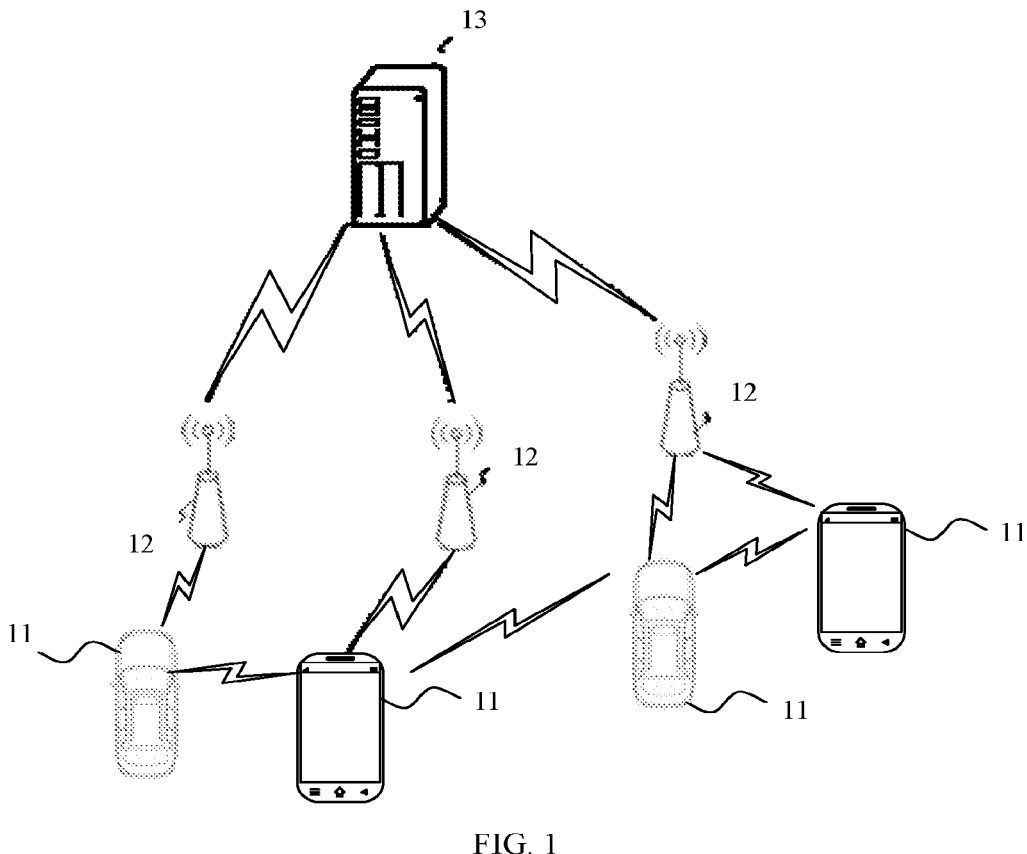
FIG. 1 is a schematic structural diagram of a wireless communication system according to some embodiments of the present disclosure.

FIG. 1 is a schematic structural diagram of a wireless communication system according to some embodiments of the present disclosure. As shown in FIG. 1, the wireless communication system is a communication system based on a cellular mobile communication technology, and the wireless communication system may include a plurality of terminals 11 and a plurality of base stations 12.

Among them, the terminal 11 may refer to a device that provides voice and/or data connectivity to a user. The terminal 11 may communicate with one or more core networks via a radio access network (RAN). The terminal 11 may be an Internet of Things terminal, such as a sensor device, a mobile phone (or referred to as a "cellular" phone) and a computer having an Internet of Things terminal. For example, it may be a fixed, portable, pocket, handheld, computer built-in or vehicle-mounted apparatus, such as a station (STA), a subscriber unit, a subscriber station, a mobile station, a mobile station, a remote station, an access point, a remote terminal, an access terminal, a user terminal, a user agent, a user device, or a user terminal (user equipment, terminal). Or, the terminal 11 may also be a device of an unmanned aerial vehicle. Or, the terminal 11 may also be a vehicle-mounted device, for example, it may be a trip computer having a wireless communication function, or a wireless terminal externally connected to a trip computer. Or, the terminal 11 may also be an infrastructure, for example, it may be a street lamp, a signal light or another infrastructure having a wireless communication function, etc.

The base station 12 may be a network-side device in the wireless communication system. Among them, the wireless communication system may be a 4th generation mobile communication (4G) system, also referred to as a long term evolution (LTE) system. Or, the wireless communication system may also be a 5G system, also referred to as a new radio (NR) system or a 5G NR system. Or, the wireless communication system may also be a next generation system of the 5G system. Among them, the access network in the 5G system may be referred to as an NG-RAN (New Generation-Radio Access Network).

Among them, the base station 12 may be an evolved base station (eNB) adopted in a 4G system. Or, the base station 12 may also be a base station (gNB) adopting a centralized distributed architecture in a 5G system. When the base station 12 adopts a centralized distributed architecture, the base station 12 generally includes a central unit (CU) and at least two distributed units (DU). The centralized unit is provided with a protocol stack of a packet data convergence protocol (PDCP) layer, a radio link layer control protocol (RLC) layer, and a media access control (MAC) layer. The distribution unit is provided with a protocol stack of a physical (PHY) layer. The specific implementation manner of the base station 12 is not limited in the embodiments of the present disclosure.

A wireless connection may be established between the base station 12 and the terminal 11 through a wireless air interface. In different embodiments, the wireless air interface is a wireless air interface based on a fourth generation mobile communication network technology (4G) standard. Or, the wireless air interface is a wireless air interface based on a fifth generation mobile communication network technology (5G) standard, for example, the wireless air interface is a new air interface. Or, the wireless air interface may also be a wireless air interface based on a next generation of 5G mobile communication network technology standard.

In some embodiments, an E2E (End to End) connection may also be established between the terminals 11, such as scenes of V2V (Vehicle to Vehicle) communication, V2I (Vehicle to Infrastructure) communication and V2P (Vehicle to Pedestrian) communication in Internet of Vehicles communication (V2X).

In some embodiments, the wireless communication system may further include a network management device 13.

Several base stations 12 are respectively connected to the network management device 13. Among them, the network management device 13 may be a core network device in a wireless communication system. For example, the network management device 13 may be a mobility management entity (MME) in an evolved packet core (EPC). Or, the network management device may also be another core network device, such as a serving gateway (SGW), a public data network gateway (PGW), a policy and charging rules function (PCRF), or a home subscriber server (HSS), etc. The implementation form of the network management device 13 is not limited by the embodiments of the present disclosure.

The electromagnetic radiation of a mobile terminal device such as a mobile phone, a smart watch, a computer may affect the safety of the human body. Especially along with the upcoming commercial use of 5G NR, the terminal supporting high frequency band and high power will become a mainstream in the market, which also objectively increases the risk of the electromagnetic radiation of the terminal on the safety of the human body.

The electromagnetic radiation standard for the human body safety of the terminal is internationally represented by SAR (Specific Absorption Rate) and MPE (Maximum Permissible Exposure). The former mainly targets a low frequency band, such as a frequency band below 6 GHz, and the latter mainly targets a millimeter wave frequency band. In the related art, the electromagnetic radiation of the terminal device may be reduced by using the power reduction of the transmission power or reducing the uplink duty cycle of the transmission.

In the embodiments of the present disclosure, in order to reduce the influence of terminal transmission on human body safety, in a single frequency band, a certain power reduction P-MPR may be used on the basis of the transmission power, or the uplink duty cycle (UL Dutycycle) transmitted by the terminal is reduced, so as to satisfy the requirement of SAR or MPE. For example, in some embodiments, utilizing the power reduction P-MPR and that the terminal needs to send the maximum uplink duty cycle capability (Maximum Dutycycle Capability) at a high power level, when the scheduled uplink duty cycle is greater than the maximum uplink duty cycle, the terminal reduces the transmission level or reduces the transmission power. In this way, it can help the terminal to reduce the influence on the human body safety. However, due to the fact that the P-MPR is controlled by each terminal manufacturer, the influence of the system on the uplink coverage capability of the terminal cannot be unified and controlled, which may result in a significant influence on uplink coverage.

In some embodiments, the terminal may satisfy the SAR requirement (a terminal having the capability, referred to as supporting the capability of intelligent regulation and control of the SAR here) through intelligently regulating and controlling power. The algorithm of dynamic power control and exposure time averaging is adopted, and the radio frequency power of the wireless communication terminal device is controlled and managed in real-time, so that the time-averaged radio frequency electromagnetic radiation data satisfies the SAR requirement. However, in this way, the signal-to-noise ratio received by the base station may cause a certain influence, and therefore, link failure may be caused.

Figure 2:
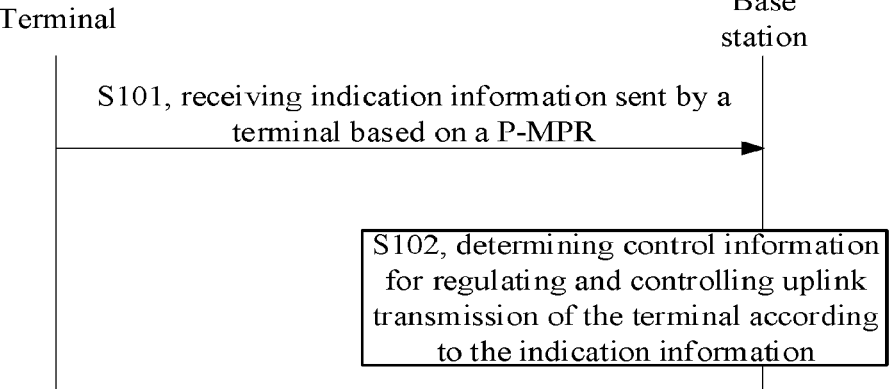
FIG. 2 is a first schematic flowchart of a method for power control according to some embodiments of the present disclosure.

As shown in FIG. 2, there is provided a method for power control according to some embodiments of the present disclosure, which is applied to a base station, and includes the following steps.

In step S101, indication information sent by a terminal based on a P-MPR is received.

In step S102, control information for regulating and controlling uplink transmission of the terminal is determined according to the indication information.

In the embodiment of the present disclosure, the indication information may include the value of the P-MPR sent by the terminal itself, the range to which the P-MPR of the terminal belongs, whether the P-MPR of the terminal exceeds a predetermined threshold, or indication of whether it is needed to regulate and control the uplink transmission determined by the terminal according to the P-MPR.

The base station receives the indication information, and may determine whether it is needed to regulated and control the control information for uplink transmission of the terminal according to the indication information. Or, the base station may determine how to regulate and control the control information according to the indication information. Or, the base station may determine a regulation and control amplitude for regulating and controlling the control information according to the indication information, etc.

The maximum power reduction (i.e., P-MPR) of the terminal is that when the terminal is in the maximum transmission power state and the power reduction condition is satisfied, the maximum transmission power is controlled to be reduced to a preset value less than the national standard. If the P-MPR of the terminal is larger, the uplink transmission of the terminal may have an excessive power reduction, which results in that requirement of uplink transmission of the terminal is not satisfied.

The above-mentioned control information is related information that can be adjusted for the received power of the uplink transmission of the terminal, so as to adjust the uplink transmission power of the terminal.

Here, the control information for the uplink transmission may include various information affecting the uplink transmission power, including the uplink transmission power, the uplink transmission signal-to-noise ratio, the duty cycle of the uplink transmission, and the like. The base station may affect the transmission power of the uplink transmission of the terminal by regulating and controlling the control information.

By regulating and controlling the control information, the uplink transmission of the terminal received by the base station may satisfy the requirement of receiving for the base station.

In this way, on one hand, the base station can perform regulation and control based on the P-MPR of the terminal, so that the adjustment capability of the terminal on electromagnetic radiation is satisfied, and the influence of uplink transmission on human health is reduced; and on the other hand, the signal-to-noise ratio requirement of the communication link is satisfied as much as possible, and the safety performance of the communication and the communication quality are balanced. That is, the possibility of communication link failure may be reduced as much as possible on the premise of satisfying the security requirement for electromagnetic radiation.

Figure 3:
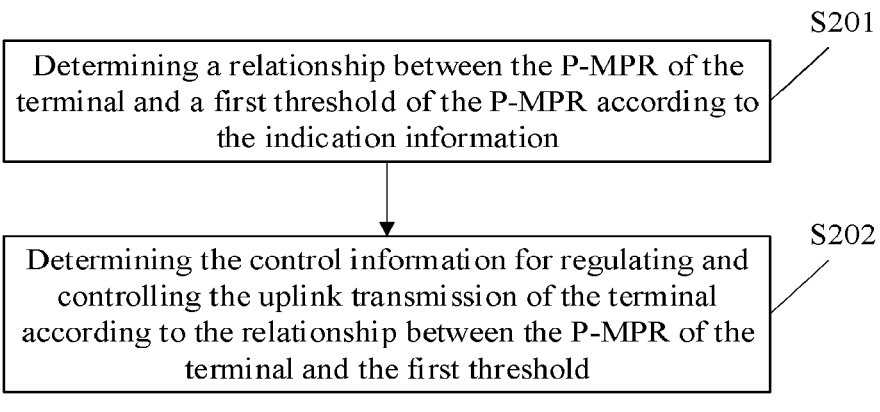
FIG. 3 is a second schematic flowchart of a method for power control according to some embodiments of the present disclosure.

In some embodiments, as shown in FIG. 3, determining the control information for regulating and controlling the uplink transmission of the terminal according to the indication information includes the following steps.

In step S201, a relationship between the P-MPR of the terminal and a first threshold of the P-MPR is determined according to the indication information.

In step S202, the control information for regulating and controlling the uplink transmission of the terminal is determined according to the relationship between the P-MPR of the terminal and the first threshold.

Here, the base station may determine the first threshold of the P-MPR of the terminal according to the communication requirement of the uplink. If the P-MPR of the terminal does not conform to the limitation of the first threshold, for example, being greater than or equal to the first threshold, it may affect the normal transmission of the uplink, causing link failure, etc. Therefore, the base station may determine the relationship between the P-MPR of the terminal and the first threshold according to the indication information, determine whether to perform regulation and control of the uplink transmission according to the relationship, and determine how to regulate and control the control information according to the relationship, or determine the regulation and control amplitude for regulating and controlling the control information and the like. For example, when it is determined that the P-MPR of the terminal exceeds the first threshold of the P-MPR according to the indication information, regulation and control may be performed for the control information.

In this way, the base station can determine the first threshold of the terminal P-MPR according to the communication requirement, and regulate and control the control information for the uplink transmission accordingly, thus reducing the situations of uplink failure or too low communication quality caused by the fact that the terminal reduces the communication quality in order to satisfy the security requirement of electromagnetic radiation.

Figure 4:
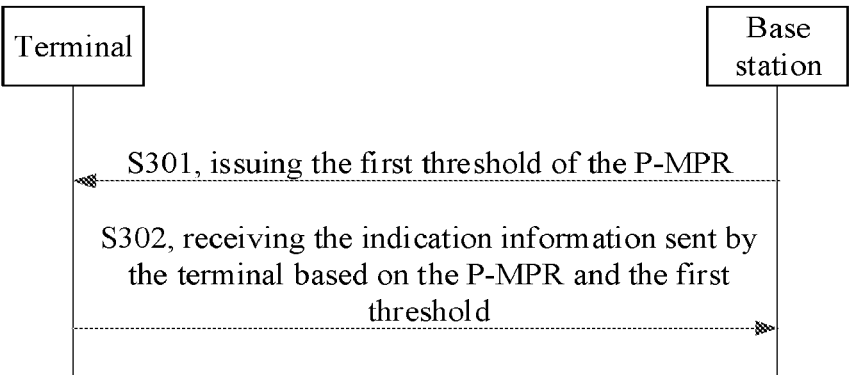
FIG. 4 is a third schematic flowchart of a method for power control according to some embodiments of the present disclosure.

There is further provided a method for power control according to some embodiments of the present disclosure, as shown in FIG. 4, the method is applied to a base station, and includes the following steps.

In step S301, the first threshold of the P-MPR is issued.

In step S302, the indication information sent by the terminal based on the P-MPR and the first threshold is received.

In the embodiment of the present disclosure, the base station may determine the first threshold of the P-MPR of the terminal according to the communication requirement of the uplink, and issue the first threshold to the terminal.

The first threshold is issued to the terminal, which may be convenient for the terminal to determine whether the P-MPR of the terminal itself satisfies the communication requirement according to the first threshold, and then send the indication information on whether it is needed for the base station to regulate and control the control information for uplink transmission of the terminal.

Or, it may be convenient for the terminal to send the indication information of the relationship between the first threshold and its own P-MPR according to the first threshold and its own P-MPR, and the base station may determine whether the P-MPR of the terminal satisfies the communication requirement according to the indication information, so as to regulate and control the above control information.

Or, it may be convenient for the terminal to adjust its own P-MPR according to the first threshold, and send the corresponding indication information based on the adjusted P-MPR.

In this way, even if the P-MPRs set by different terminal manufacturers are different, unified management and adjustment of the uplink transmission may be performed by the base station.

In some embodiments, issuing the first threshold of the P-MPR includes: issuing the first threshold of the P-MPR through broadcasting; and/or, issuing RRC (Radio Resource Control) signaling carrying the first threshold of the P-MPR.

In the embodiment of the present disclosure, issuing the first threshold may be performed through the manner of broadcasting, so that each terminal of the base station may obtain a unified first threshold through broadcasting. The first threshold may also be independently determined for different terminals, and therefore, the broadcasting that carries the first threshold may also carry the identification of the corresponding terminal at the same time, so that the terminal obtains the information of the corresponding first threshold through broadcasting.

In addition, the base station may also carry the first threshold in the RRC signaling and issue it to the terminal, for example, by using one or more character bits or a dedicated field in the RRC signaling to carry the value information of the first threshold.

The base station may also issue the first threshold to the terminal through dedicated signaling as agreed in a protocol.

In the embodiment of the present disclosure, the base station may determine the manner of issuing the first threshold based on the state of the terminal. For example, if the terminal is in a connected state, the first threshold may be issued to the terminal through RRC signaling or the like. If the terminal is in an idle state or an inactive state, the first threshold may be issued to the terminal through broadcasting. In some embodiments, the base station may issue the first threshold through broadcasting, and issue the first threshold through the RRC signaling, that is, both the base station broadcasting and the RRC signaling carry the first threshold. In this way, on one hand, the terminal may determine the manner in which the first threshold is received according to its own state; for example, if the terminal is in a connected state, the first threshold is obtained through the RRC signaling; if the terminal is in an idle state or an inactive state, the first threshold is obtained through the base station broadcasting; and on the other hand, the terminal may also respectively receive the first threshold through broadcasting and RRC signaling, thus improving the reliability of information reception.

In some embodiments, the indication information includes at least one of the following: first indication information indicating that the P-MPR of the terminal is greater than the first threshold; second indication information indicating that the P-MPR of the terminal is less than or equal to the first threshold; indicating a difference between the P-MPR of the terminal and the first threshold; indicating a difference range that the difference between the P-MPR of the terminal and the first threshold belongs to.

In the embodiment of the present disclosure, the indication information sent by the terminal may be indication information determined by the terminal according to a size relationship between the its own P-MPR and the first threshold. For example, the size relationship is indicated by using RRC signaling or dedicated signaling or other information to carry one character bit. For example, the first indication information is that the value of the character bit is 0, and the second indication information is that the value of the character bit is 1. The size relationship may also be implicitly indicated by using existing signaling through an encoding and decoding method, a check bit, a reserved bit, and a signaling form, where the first indication information or the second indication information is respectively represented in different forms. In this way, the base station may determine whether it is needed to regulate and control the control information for the uplink transmission according to the indication information being the first indication information or the second indication information.

In addition, the indication information may also include a difference between the P-MPR based on the terminal itself and the first threshold, or a range to which the difference belongs. In this way, the base station may determine, according to the difference or the range to which the difference belongs, whether to regulate and control the control information for the uplink transmission, and determine the regulation and control amplitude of the regulation and control of the control information for the uplink transmission, etc.

In some embodiments, receiving the indication information sent by the terminal based on the P-MPR includes: receiving RRC signaling carrying the indication information; and/or, receiving a PHR carrying the indication information.

In the embodiment of the present disclosure, the indication information may be carried in the RRC signaling, or may be carried in the PHR entity. For example, one or more character bits are used in the RRC signaling to carry the indication information; or, one or more reserved character bits in the PHR entity are used to carry the indication information.

Here, if the indication information is only used to indicate whether the P-MPR of the terminal exceeds the first threshold, one character bit may be used, for example, 0 indicating that the P-MPR of the terminal does not exceed the first threshold, and 1 indicating that the P-MPR of the terminal exceeds the first threshold. If the indication information is further used to indicate a difference between the P-MPR of the terminal and the first threshold or a range to which the difference belongs, a plurality of character bits may be used to represent the indication information.

Here, when receiving the RRC signaling and the PHR, the base station may respectively obtain the indication information among them. If both the RRC signaling and the PHR carry the indication information, the base station may discard one of them, or be based on any indication information of them.

In some embodiments, the control information includes at least one of the following: a scheduling instruction for specifying an uplink duty cycle; a second threshold of a signal-to-noise ratio of the uplink transmission; a third threshold of a received power of the uplink transmission.

In the embodiment of the present disclosure, the base station implements power control on the terminal by regulating and controlling the control information. The base station may adjust the uplink duty cycle of the terminal through scheduling, the smaller the uplink duty cycle, and the lower the uplink power. Therefore, if the base station determines, according to the indication information of the terminal, that it is needed to regulate and control, the base station may issue a scheduling instruction for specifying an uplink duty cycle, for example, a scheduling instruction for reducing the uplink duty cycle.

In addition, the base station may also adjust a signal-to-noise ratio threshold or a received power threshold for the uplink transmission. For example, the second threshold is reduced or the third threshold is reduced, so that uplink transmission can also be performed under the condition that the uplink transmission signal-to-noise ratio of the terminal is relatively lower or the uplink power is relatively lower, and operations such as cell reselection do not need to be carried out.

Therefore, by regulating and controlling the control information, the uplink transmission of the terminal can be regulated and controlled according to the capability and the communication requirement of the terminal, so that the uplink communication satisfies the safety requirement of the transmission power, the requirement of the communication quality is satisfied, and the situation of link failure is reduced.

Figure 5:
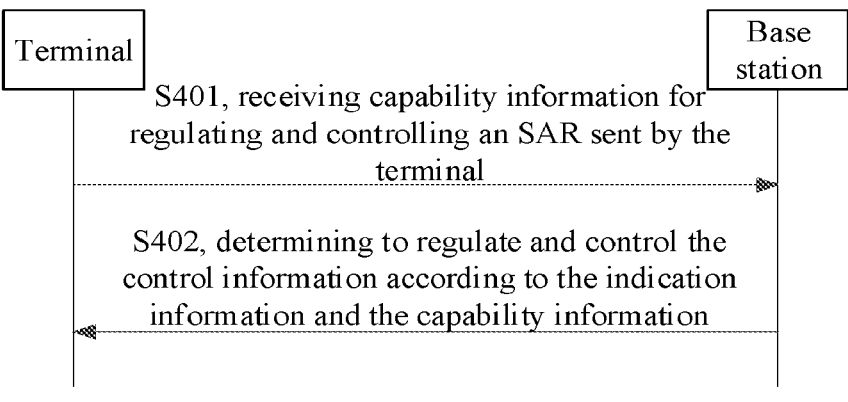
FIG. 5 is a fourth schematic flowchart of a method for power control according to some embodiments of the present disclosure.

There is further provided a method for power control according to some embodiments of the present disclosure. As shown in FIG. 5, the method is applied to a base station, and includes the following step.

In step S401, capability information for regulating and controlling an SAR sent by the terminal is received.

Determining the control information for regulating and controlling uplink transmission of the terminal according to the indication information includes the following step.

In step S402, it is determined to regulate and control the control information according to the indication information and the capability information.

Here, the terminal may be a terminal having an SAR intelligent regulation and control capability, and the terminal may adopt algorithm of dynamic power control and exposure time averaging, and control and manage the radio frequency power of the terminal in real time, such that the time-averaged radio frequency electromagnetic radiation satisfies the SAR requirement.

In the embodiment of the present disclosure, the base station may determine whether to regulate and control the control information and how to regulate and control the control information, according to the capability information indicating whether the terminal has the capability of regulating and controlling the SAR and the indication information corresponding to the P-MPR of the terminal.

For example, if the terminal has no capability of regulating and controlling the SAR, the base station may reduce the uplink duty cycle of the terminal through scheduling according to the indication information, thus actively adjusting the uplink transmission power of the terminal. If the terminal has the capability of regulating and controlling the SAR, the uplink transmission of the terminal may have a dynamically changed signal-to-noise ratio and uplink power, and therefore, the base station may reduce the situations of uplink transmission failure by reducing the signal-to-noise ratio threshold or the received power threshold according to the indication information.

In some embodiments, determining to regulate and control the control information according to the indication information and the capability information, includes at least one of the following: in response to the capability information indicating that the terminal has the capability of regulating and controlling the SAR, determining the second threshold of the signal-to-noise ratio or the third threshold of the received power of an uplink signal according to the indication information; in response to the capability information indicating that the terminal has the capability of regulating and controlling the SAR and the signal-to-noise ratio of the uplink transmission being lower than the second threshold, issuing the scheduling instruction for specifying the link duty cycle according to the indication information, where the scheduling instruction is used for reducing the uplink duty cycle of the terminal; in response to the capability information indicating that the terminal has the capability of regulating and controlling the SAR and the received power of the uplink transmission being lower than the third threshold, issuing the scheduling instruction for specifying the uplink duty cycle according to the indication information; in response to the capability information indicating that the terminal has no capability of regulating and controlling the SAR, issuing the scheduling instruction for specifying the uplink duty cycle according to the indication information.

In this way, for different types of terminals and the capability of the terminals, the base station can regulate and control the uplink transmission in different manners, so that the situation of link failure is reduced as much as possible while ensuring that the uplink transmission satisfies the security requirement, and the reliability of transmission is improved.

Figure 6:
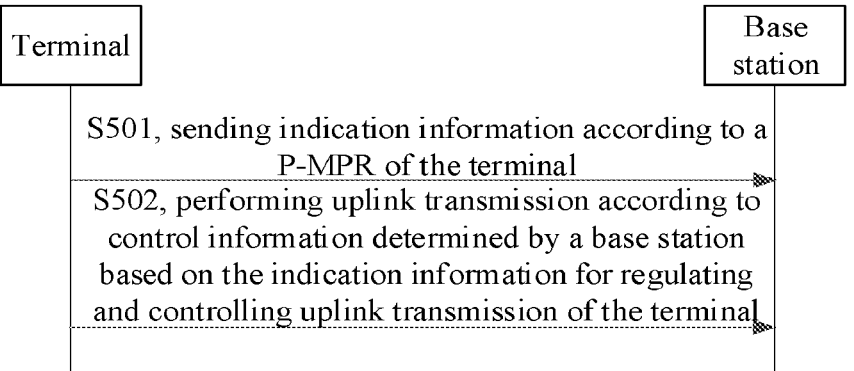
FIG. 6 is a fifth schematic flowchart of a method for power control according to some embodiments of the present disclosure.

As shown in FIG. 6, there is provided a method for power control according to some embodiments of the present disclosure, which is applied to a terminal, and includes the following steps.

In step S501, indication information is sent according to a P-MPR of the terminal;

In step S502, uplink transmission is performed according to control information determined by a base station based on the indication information for regulating and controlling uplink transmission of the terminal.

In the embodiment of the present disclosure, the indication information may include the P-MPR sent by the terminal itself, may also include information indicated by the terminal based on its own P-MPR, such as the range to which the P-MPR of the terminal belongs, whether the P-MPR of the terminal exceeds a predetermined threshold, or indication of whether it is needed to regulate and control the uplink transmission determined by the terminal according to the P-MPR.

The base station receives the indication information, and may determine, whether it is needed to regulated and control the control information for uplink transmission of the terminal, how to regulate and control/a regulation and control amplitude, and the like, according to the indication information.

Therefore, the terminal can perform uplink transmission based on the regulation and control of the base station. In this way, the terminal can control power according to safety requirement and uplink transmission requirement, thus reducing the problem of link failure caused by power reduction, and improving transmission reliability while reducing the influence of transmission power on human health.

In some embodiments, the method further includes: receiving a first threshold of the P-MPR issued by the base station; sending the indication information according to the P-MPR of the terminal includes: sending the indication information according to the P-MPR of the terminal and the first threshold.

Here, the first threshold may be a terminal P-MPR threshold determined by the base station according to the communication requirement of the uplink. If the P-MPR of the terminal does not conform to the limitation of the first threshold, for example, being greater than or equal to the first threshold, it may affect the normal transmission of the uplink, causing link failure, etc. Therefore, the terminal may send the indication information according to the relationship between its own P-MPR and the first threshold. Therefore, it is convenient for the base station to determine, according to the relationship, whether to regulate and control the uplink transmission, and how to regulate and control the uplink transmission, or the regulation and control amplitude, and the like. For example, when the P-MPR of the terminal exceeds the first threshold of the P-MPR, the indication information may be sent to instruct the base station to regulate and control the control information for uplink transmission.

In this way, the terminal determines, according to the first threshold of the P-MPR provided by the base station, whether its own P-MPR satisfies the transmission requirement, and then notifies the base station whether to regulate and control the control information for the uplink transmission, thus reducing situations of uplink failure or too low communication quality caused by the fact that the terminal reduces the communication quality in order to satisfy the security requirement of electromagnetic radiation.

In some embodiments, sending the indication information according to the P-MPR of the terminal and the first threshold includes: sending the indication information in response to the P-MPR of the terminal being greater than the first threshold; or sending the indication information in response to the P-MPR of the terminal being greater than the first threshold, an MPR of the terminal, and an A-MPR of the terminal.

Here, the terminal may compare its own P-MPR with the first threshold provided by the base station, and send the indication information according to the comparison result. If the P-MPR of the terminal is greater than the first threshold, the terminal may instruct the base station to regulate and control the control information for the uplink transmission.

When the P-MPR is greater than the first threshold, the terminal may further compare its own P-MPR with the MPR and the A-MPR, and may send the indication information if the P-MPR is the largest among the three.

Here, the MPR and the A-MPR are related to the position, the size, and the modulation order of the actual resource block scheduled by the terminal, and the terminal may determine whether to regulate and control the control information for the uplink according to the size relationship between the P-MPR and the two of the MPR and the A-MPR.

In some embodiments, receiving the first threshold of the P-MPR issued by the base station includes: receiving the first threshold of the P-MPR broadcasted by the base station; and/or, receiving RRC signaling carrying the first threshold of the P-MPR issued by the base station.

In the embodiment of the present disclosure, the terminal obtains the first threshold from the base station broadcasting, so that each terminal of the base station may obtain a unified first threshold through broadcasting. The first threshold may also be independently determined for different terminals, and therefore, the broadcasting that carries the first threshold may also carry the identification of the corresponding terminal at the same time. The terminal may obtain the information of the corresponding first threshold through the identification in the broadcasting.

In addition, the base station may also carry the first threshold in the RRC signaling and issue it to the terminal, for example, by using one or more character bits or a dedicated field in the RRC signaling to carry the value information of the first threshold.

The base station may also issue the first threshold to the terminal through dedicated signaling as agreed in a protocol.

In some embodiments, the base station broadcasting and the RRC signaling may both carry the first threshold. On one hand, the terminal may determine the manner of receiving the first threshold according to its own state. For example, if the terminal is in a connected state, the terminal obtains the first threshold through RRC signaling. If the terminal is in an idle state or an inactive state, the terminal obtains the first threshold through the base station broadcasting. On the other hand, the terminal may also respectively receive the first threshold through broadcasting and RRC signaling, thus improving the reliability of information reception.

In some embodiments, the indication information includes at least one of the following: first indication information indicating that the P-MPR of the terminal is greater than the first threshold; second indication information indicating that the P-MPR of the terminal is less than or equal to the first threshold; indicating a difference between the P-MPR of the terminal and the first threshold; indicating a difference range that the difference between the P-MPR of the terminal and the first threshold belongs to.

In the embodiment of the present disclosure, the indication information sent by the terminal may be indication information determined by the terminal according to a size relationship between the its own P-MPR and the first threshold. For example, the size relationship is indicated by using RRC signaling or dedicated signaling or other information to carry one character bit. For example, the first indication information is that the value of the character bit is 0, and the second indication information is that the value of the character bit is 1. The size relationship may also be implicitly indicated by using existing signaling through an encoding and decoding method, a check bit, a reserved bit, and a signaling form, where the first indication information or the second indication information is respectively represented in different forms. In this way, the base station may determine whether it is needed to regulate and control the control information for the uplink transmission according to the indication information being the first indication information or the second indication information.

In addition, the indication information may also include a difference between the P-MPR based on the terminal itself and the first threshold or a range to which the difference belongs. In this way, the base station may determine, according to the difference or the range to which the difference belongs, whether to regulate and control the control information for the uplink transmission, and determine the regulation and control amplitude of the regulation and control of the control information for the uplink transmission, etc.

In some embodiments, sending the indication information according to the P-MPR of the terminal includes: sending RRC signaling carrying the indication information according to the P-MPR of the terminal; and/or, sending a PHR carrying the indication information according to the P-MPR of the terminal.

In the embodiment of the present disclosure, the indication information may be carried in the RRC signaling, or may be carried in the PHR entity. For example, one or more character bits are used in the RRC signaling to carry the indication information; or, one or more reserved character bits in the PHR entity are used to carry the indication information.

Here, if the indication information is only used to indicate whether the P-MPR of the terminal exceeds the first threshold, one character bit may be used, for example, 0 indicating that the P-MPR of the terminal does not exceed the first threshold, and 1 indicating that the P-MPR of the terminal exceeds the first threshold. If the indication information is further used to indicate a difference between the P-MPR of the terminal and the first threshold or a range to which the difference belongs, a plurality of character bits may be used to represent the indication information.

In an embodiment, the terminal may respectively carry the indication information in the RRC signaling and the PHR and send the indication information to the base station, so that the reliability of receiving the indication information by the base station is improved.

In some embodiments, the method further includes: sending capability information of the terminal for regulating and controlling an SAR; performing the uplink transmission according to the control information determined by the base station based on the indication information for regulating and controlling the uplink transmission of the terminal includes: performing the uplink transmission according to the control information determined by the base station based on the indication information and the capability information for regulating and controlling the uplink transmission of the terminal.

Here, the terminal may be a terminal having an SAR intelligent regulation and control capability, and the terminal may adopt algorithm of dynamic power control and exposure time averaging, and control and manage the radio frequency power of the terminal in real time, such that the time-averaged radio frequency electromagnetic radiation satisfies the SAR requirement.

In the embodiment of the present disclosure, the base station may determine whether to regulate and control the control information and how to regulate and control the control information, according to the capability information indicating whether the terminal has the capability of regulating and controlling the SAR and the indication information corresponding to the P-MPR of the terminal.

For example, if the terminal has no capability of regulating and controlling the SAR, the base station may reduce the uplink duty cycle of the terminal by scheduling according to the indication information, thus actively adjusting the uplink transmission power of the terminal. If the terminal has the capability of regulating and controlling the SAR, the uplink transmission of the terminal may have a dynamically changed signal-to-noise ratio and uplink power, and therefore, the base station may reduce the situations of uplink transmission failure by reducing the signal-to-noise ratio threshold or the received power threshold according to the indication information.

In some embodiments, the control information includes at least one of the following: a scheduling instruction for specifying an uplink duty cycle; a second threshold of a signal-to-noise ratio of the uplink transmission; a third threshold of a received power of the uplink transmission.

In the embodiment of the present disclosure, the base station implements power control on the terminal by regulating and controlling the control information. The base station may adjust the uplink duty cycle of the terminal through scheduling, the smaller the uplink duty cycle, and the lower the uplink power. Therefore, if the base station determines, according to the indication information of the terminal, that it is needed to regulate and control, the base station may issue a scheduling instruction for specifying an uplink duty cycle, for example, a scheduling instruction for reducing the uplink duty cycle.

In addition, the base station may also adjust a signal-to-noise ratio threshold or a received power threshold for the uplink transmission. For example, the second threshold is reduced or the third threshold is reduced, so that uplink transmission can also be performed under the condition that the uplink transmission signal-to-noise ratio of the terminal is relatively lower or the uplink power is relatively lower, and operations such as cell reselection do not need to be carried out.

Therefore, by regulating and controlling the control information, the uplink transmission of the terminal can be regulated and controlled according to the capability and the communication requirement of the terminal, so that the uplink communication satisfies the safety requirement of the transmission power, the requirement of the communication quality is satisfied, and the situation of link failure is reduced.

Figure 7:
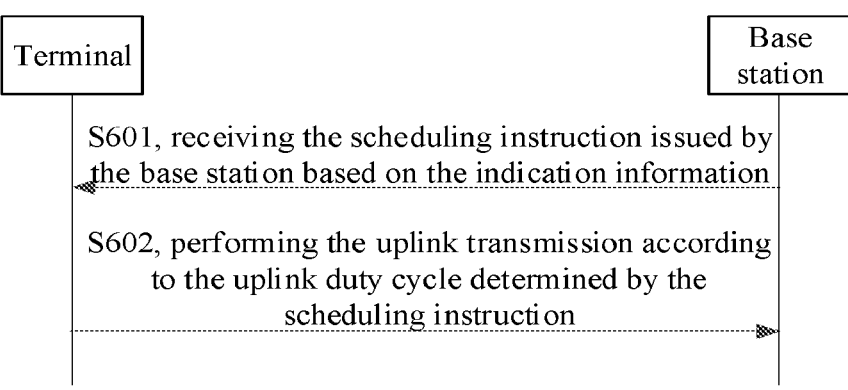
FIG. 7 is a sixth schematic flowchart 6 of a method for power control according to some embodiments of the present disclosure.

In some embodiments, as shown in FIG. 7, the method further includes the following step.

In step S601, the scheduling instruction issued by the base station based on the indication information is received.

Performing the uplink transmission according to the control information determined by the base station based on the indication information for regulating and controlling the uplink transmission of the terminal includes the following step.

In step S602, the uplink transmission is performed according to the uplink duty cycle determined by the scheduling instruction.

In the embodiment of the present disclosure, since the base station may adjust the uplink duty cycle of the uplink transmission of the terminal through scheduling, the terminal may receive the scheduling instruction of the base station, and perform uplink transmission based on the uplink duty cycle determined by the scheduling instruction, so as to regulate and control the uplink power.

The embodiments of the present disclosure provide following examples.

The terminal sends to the base station whether supporting the capability of intelligent regulation and control of the SAR. The terminal receives the P-MPR0 threshold configured by the base station, and if it is determined that the used P-MPR exceeds the P-MPR0, the terminal notifies the base station. After receiving the information, the base station performs corresponding processing according to the capability of the terminal.

The terminal receives the P-MPR0 threshold configured by the base station. The terminal may receive the configured threshold by receiving the broadcasting channel of the base station, or receive the threshold configured by the base station through the RRC signaling.

In some embodiments, the terminal receives the P-MPR0 threshold configured by the base station through the RRC signaling, that is, the first threshold. If it is determined that the used P-MPR exceeds the P-MPR0, the terminal notifies the base station. After receiving the information, the base station performs corresponding processing according to the capability of the terminal.

The terminal receives the P-MPR0 threshold configured by the base station. The terminal may receive the configured threshold through the broadcasting channel, or receive the threshold configured by the base station through the RRC signaling.

Figure 8:
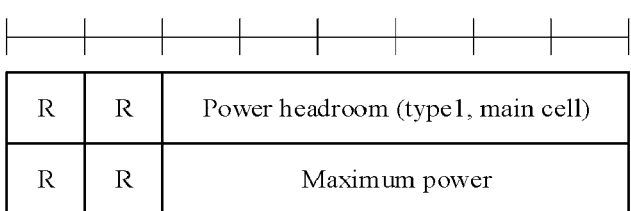
FIG. 8 is a schematic structural diagram of a PHR (Power Headroom Report) entity according to some embodiments of the present disclosure.

If it is determined that the used P-MPR exceeds the P-MPR0, the terminal notifies the base station. In an embodiment, the base station is notified through the RRC signaling of one character bit. In another embodiment, as shown in FIG. 8, information that whether the P-MPR exceeds P-MPR0 is sent by using the reserved bit R in the PHR entity. For example, r=1 represents that the P-MPR exceeds P-MPR0.

After receiving the information, the base station performs corresponding processing according to the capability of the terminal. In one embodiment, after receiving the information that whether the P-MPR exceeds the P-MPR0, the base station reduces the uplink duty cycle of the terminal by scheduling.

In another embodiment, after the base station receives the information that whether the P-MPR exceeds the P-MPR0, if the base station determines that the terminal is a terminal having the capability of intelligent regulation and control of the SAR through the capability sent by the terminal, the base station may correspondingly reduce the lowest signal-to-noise ratio threshold or the received power threshold.

In some embodiments, after receiving the information, the base station performs corresponding processing according to the capability of the terminal.

In another embodiment, if the base station determines that the terminal is a terminal having the capability of intelligent regulation and control of the SAR through the capability sent by the terminal, and when the signal-to-noise ratio or the received power received by the base station is lower than a certain preset lowest threshold, the base station reduces the uplink duty cycle of the terminal through scheduling until the signal-to-noise ratio or the received power received by the base station is higher than a certain preset lowest threshold.

In some embodiments, if it is determined that the used P-MPR exceeds the P-MPR0, the terminal notifies the base station. In another embodiment, the terminal directly sends the difference of the P-MPR exceeding the P-MPR0 or the range measurement of the corresponding difference, such as being lower (the difference being smaller), being moderate (the difference being moderate), being higher (the difference being larger), etc., which is sent to the notification base station through RRC signaling of a plurality of character bits. In another embodiment, the range measurement of the difference corresponding to the difference of the P-MPR exceeding the P-MPR0 is sent by using the reserved bit in the PHR sending entity.

After receiving the information, the base station performs corresponding processing according to the capability of the terminal.

When the information received by the base station includes the difference or the range measurement information of the difference, the base station may determine, according to the information, that the base station schedules and reduces the size of the uplink duty cycle of the terminal. It is as shown in Table 1 below.

TABLE 1

| Relationship between difference range and regulation and control of uplink duty cycle | | |
|---|---|---|
| First range (difference being smaller) | Second range (difference being moderate) | Third range (difference being larger) |
| Uplink duty cycle being less than 100% | Uplink duty cycle being less than 50% | Uplink duty cycle being less than 10% |

In some embodiments, the terminal sends to the base station whether to support the capability of intelligent regulation and control of the SAR. After receiving the P-MPR0 threshold configured by the base station, the terminal notifies the base station if it is determined that the used P-MPR exceeds the P-MPR0. After receiving the information, the base station performs corresponding processing according to the capability of the terminal.

The terminal notifies the base station if it is determined that the used P-MPR exceeds the P-MPR0. It is not only compared whether the P-MPR exceeds the size of the P-MPR0, but also it is needed to compare the P-MPR with the sizes of the MPR and A-MPR (where the MPR and the A-MPR are related to the position, the size, and the modulation order of the actual resource block scheduled by the terminal). If the P-MPR is maximum of the three, it is to notify the base station, otherwise, it is not needed to notify the base station.

It should be noted that the above-mentioned solution of the embodiments of the present disclosure is not only applicable to a single carrier situation, but also suitable for a multi-carrier situation. The terminal performs sending and processing according to the P-MPR of each carrier, respectively, and the base station also performs respectively processing for different carriers.

The multi-carrier system described in the above method not only refers to a carrier aggregation technology and a dual connectivity (DC) technology, but also may include a multi-RAT dual connectivity (MRDC) technology, such as EN-DC (E-UTRA and NR dual connectivity) and NE-DC (NR and E-UTRA dual connectivity), etc.

Figure 9:
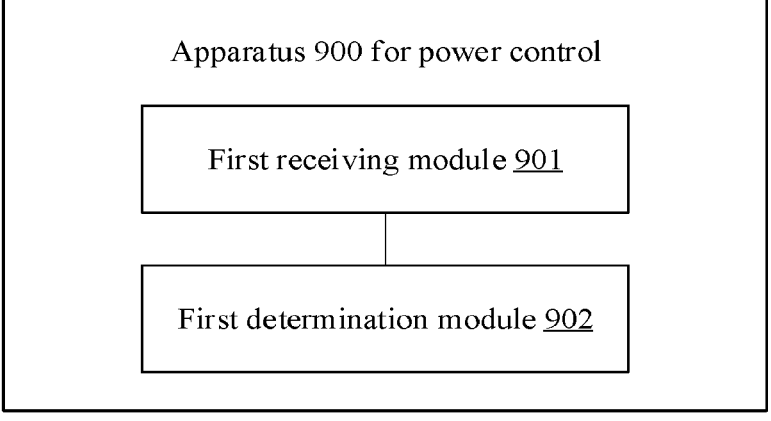
FIG. 9 is a first structural block diagram of an apparatus for power control according to some embodiments of the present disclosure.

As shown in FIG. 9, there is further provided an apparatus 900 for power control according to some embodiments of the present disclosure, which is applied to a base station and includes a first receiving module 901 and a first determination module 902. The first receiving module 901 is configured to receive indication information sent by a terminal based on a P-MPR.

The first determination module 902 is configured to determine control information for regulating and controlling uplink transmission of the terminal according to the indication information.

In some embodiments, the first determination module includes a first determination submodule and a second determination submodule.

The first determination submodule is configured to determine a relationship between the P-MPR of the terminal and a first threshold of the P-MPR according to the indication information;

The second determination submodule is configured to determine the control information for regulating and controlling the uplink transmission of the terminal according to the relationship between the P-MPR of the terminal and the first threshold.

In some embodiments, the apparatus further includes a first issuing module.

The first issuing module is configured to issue the first threshold of the P-MPR.

The first receiving module includes a first receiving submodule.

The first receiving submodule is configured to receive the indication information sent by the terminal based on the P-MPR and the first threshold.

In some embodiments, the first issuing module includes a first issuing submodule and/or a second issuing submodule.

The first issuing submodule is configured to issue the first threshold of the P-MPR through broadcasting;

The second issuing submodule is configured to issue RRC signaling carrying the first threshold of the P-MPR.

In some embodiments, the indication information includes at least one of the following: first indication information indicating that the P-MPR of the terminal is greater than the first threshold; second indication information indicating that the P-MPR of the terminal is less than or equal to the first threshold; indicating a difference between the P-MPR of the terminal and the first threshold; indicating a difference range that the difference between the P-MPR of the terminal and the first threshold belongs to.

In some embodiments, the first receiving module includes a second receiving submodule and/or a third receiving submodule.

The second receiving submodule is configured to receive RRC signaling carrying the indication information;

The third receiving submodule is configured to receive a PHR carrying the indication information.

In some embodiments, the control information includes at least one of the following: a scheduling instruction for specifying an uplink duty cycle; a second threshold of a signal-to-noise ratio of the uplink transmission; a third threshold of a received power of the uplink transmission.

In some embodiments, the apparatus further includes a second receiving module.

The second receiving module is configured to receive capability information for regulating and controlling a specific absorption rate (SAR) sent by the terminal;

The first determination module includes a third determination submodule.

The third determination submodule is configured to determine to regulate and control the control information according to the indication information and the capability information.

In some embodiments, the third determination submodule includes at least one of a fourth determination submodule, a third issuing submodule, a fourth issuing submodule, or a fifth issuing submodule.

The fourth determination submodule is configured to, in response to the capability information indicating that the terminal has a capability of regulating and controlling the SAR, determine the second threshold of the signal-to-noise ratio or the third threshold of the received power of an uplink signal according to the indication information;

The third issuing submodule is configured to, in response to the capability information indicating that the terminal has the capability of regulating and controlling the SAR and the signal-to-noise ratio of the uplink transmission being lower than the second threshold, issue the scheduling instruction for specifying the uplink duty cycle according to the indication information, where the scheduling instruction is used for reducing the uplink duty cycle of the terminal;

The fourth issuing submodule is configured to, in response to the capability information indicating that the terminal has the capability of regulating and controlling the SAR and the received power of the uplink transmission being lower than the third threshold, issue the scheduling instruction for specifying the uplink duty cycle according to the indication information;

The fifth issuing submodule is configured to, in response to the capability information indicating that the terminal has no capability of regulating and controlling the SAR, issue the scheduling instruction for specifying the uplink duty cycle according to the indication information.

Figure 10:
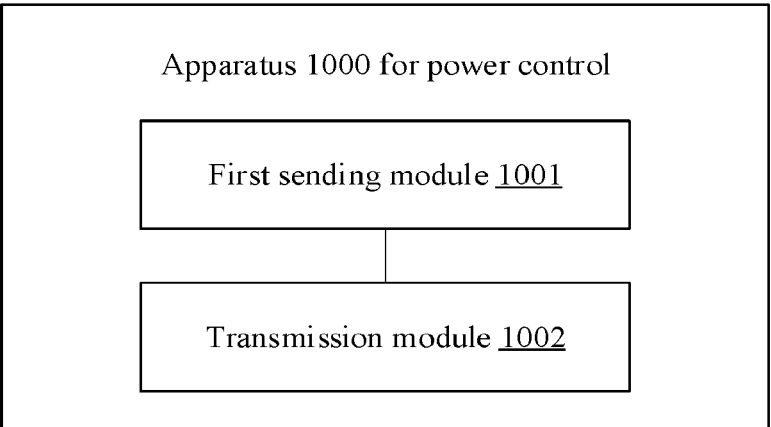
FIG. 10 is a second structural block diagram of an apparatus for power control according to some embodiments of the present disclosure.

As shown in FIG. 10, there is further provided an apparatus 1000 for power control according to some embodiments of the present disclosure, which is applied to a terminal and includes a first sending module 1001 and a transmission module 1002.

The first sending module 1001 is configured to send indication information according to a P-MPR of the terminal.

The transmission module 1002 is configured to perform uplink transmission according to control information determined by a base station based on the indication information for regulating and controlling the uplink transmission of the terminal.

In some embodiments, the apparatus further includes a third receiving module.

The third receiving module is configured to receive a first threshold of the P-MPR issued by the base station;

The first sending module includes a first sending submodule.

The first sending submodule is configured to send the indication information according to the P-MPR of the terminal and the first threshold.

In some embodiments, the first sending submodule includes a second sending submodule or a third sending submodule.

The second sending submodule is configured to send the indication information in response to the P-MPR of the terminal being greater than the first threshold;

The third sending submodule is configured to send the indication information in response to the P-MPR of the terminal being greater than the first threshold, an MPR of the terminal, and an A-MPR of the terminal.

In some embodiments, the third receiving module includes a fourth receiving submodule and/or a fifth receiving submodule.

The fourth receiving submodule is configured to receive the first threshold of the P-MPR broadcasted by the base station;

The fifth receiving submodule is configured to receive RRC signaling carrying the first threshold of the P-MPR issued by the base station.

In some embodiments, the indication information includes at least one of the following: first indication information indicating that the P-MPR of the terminal is greater than the first threshold; second indication information indicating that the P-MPR of the terminal is less than or equal to the first threshold; indicating a difference between the P-MPR of the terminal and the first threshold; indicating a difference range that the difference between the P-MPR of the terminal and the first threshold belongs to.

In some embodiments, the first sending module includes a fourth sending submodule and/or a fifth sending submodule.

The fourth sending submodule is configured to send RRC signaling carrying the indication information according to the P-MPR of the terminal;

The fifth sending submodule configured to send a PHR carrying the indication information according to the P-MPR of the terminal.

In some embodiments, the apparatus further includes a second sending module.

The second sending module is configured to send capability information of the terminal for regulating and controlling an SAR;

The transmission module includes a first transmission submodule.

The first transmission submodule is configured to perform the uplink transmission according to the control information determined by the base station based on the indication information and the capability information for regulating and controlling the uplink transmission of the terminal.

In some embodiments, the control information includes at least one of the following: a scheduling instruction for specifying an uplink duty cycle; a second threshold of a signal-to-noise ratio of the uplink transmission; a third threshold of a received power of the uplink transmission.

In some embodiments, the apparatus further includes a fourth receiving module.

The fourth receiving module is configured to receive the scheduling instruction issued by the base station based on the indication information;

The transmission module includes a second transmission submodule.

The second transmission submodule is configured to perform the uplink transmission according to the uplink duty cycle determined by the scheduling instruction.

With regard to the apparatus in the above embodiments, the specific manner in which each module performs an operation has been described in detail in the embodiments related to the method, and will not be described in detail here.

Figure 11:
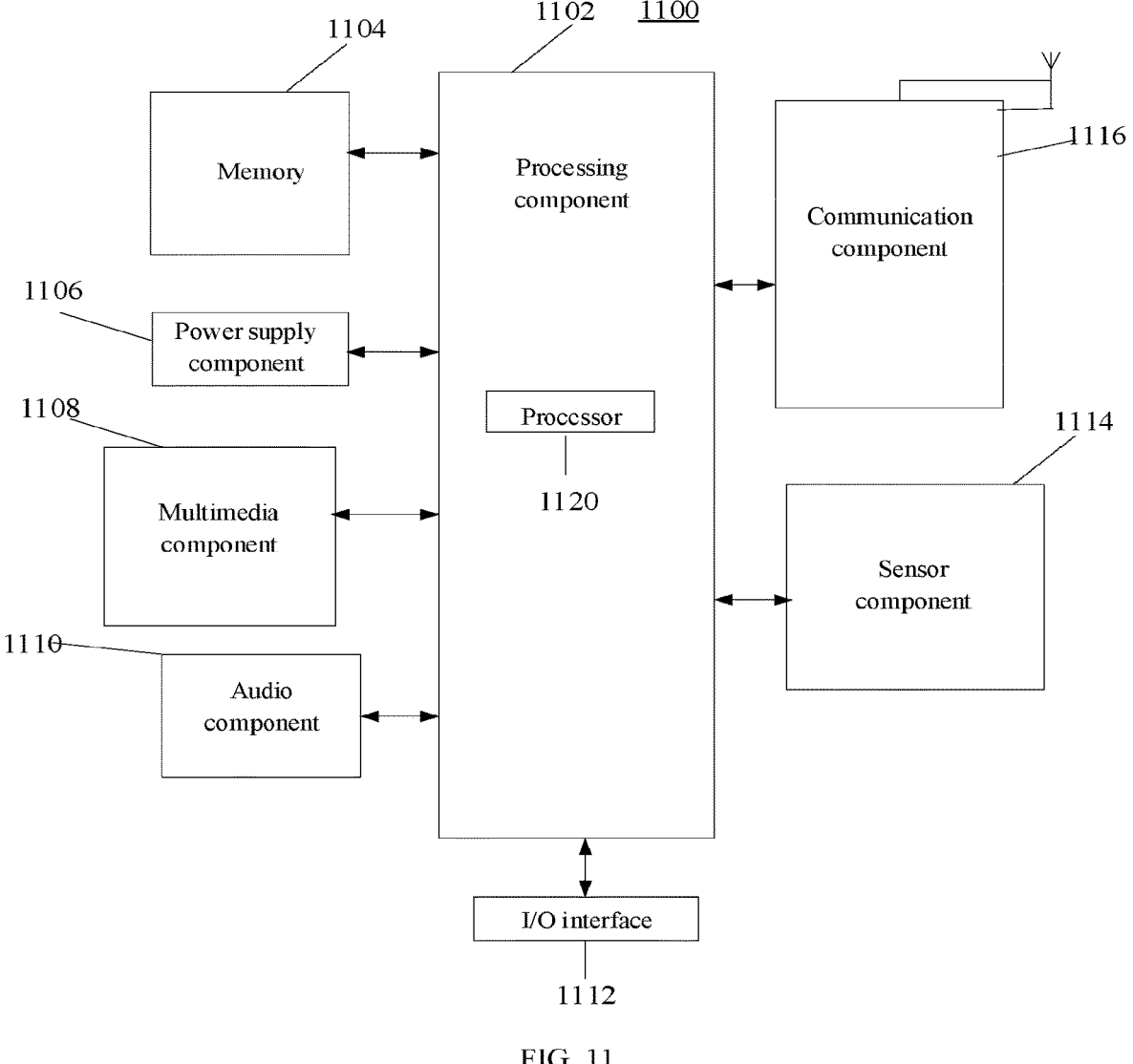
FIG. 11 is a first schematic structural diagram of a communication device according to some embodiments of the present disclosure.

FIG. 11 is a structural block diagram of a communication device according to some embodiments of the present disclosure. The communication device may be a terminal. For example, the communication device 1100 may be a mobile phone, a computer, a digital broadcast user device, a messaging transceiver, a game console, a tablet device, a medical device, a fitness device, a personal digital assistant, etc.

Referring to FIG. 11, the communication device 1100 may include at least one of a processing component 1102, a memory 1104, a power supply component 1106, a multimedia component 1108, an audio component 1110, an input/output (I/O) interface 1112, a sensor component 1114, and a communication component 1116.

The processing component 1102 generally controls the overall operation of the communication device 1100, such as operations associated with display, telephone calls, data communications, camera operations, and recording operations. The processing component 1102 may include at least one processor 1120 for executing instructions to complete all or some of the steps of the foregoing method. In addition, the processing component 1102 may include at least one module to facilitate interaction between the processing component 1102 and other components. For example, the processing component 1102 may include a multimedia module to facilitate interaction between the multimedia component 1108 and the processing component 1102.

The memory 1104 is configured to store various types of data to support operations at the communication device 1100. Examples of such data include instructions for any application or method used to operate on the communication device 1100, contact data, phonebook data, messages, pictures, videos, and the like. The memory 1104 may be implemented by any type of volatile or non-volatile storage device or a combination of them, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 1106 provides electrical power to various components of the communication device 1100. The power supply component 1106 may include a power management system, at least one power supply, and other components associated with generating, managing, and allocating power to the communication device 1100.

The multimedia component 1108 includes a screen providing an output interface between the communication device 1100 and a user. In some embodiments, the screen may include a liquid crystal display (LCD) and a touch panel (TP). If the screen includes a touch panel, the screen may be implemented as a touch screen to receive an input signal from a user. The touch panel includes at least one touch sensor to sense a touch, a slide, and a gesture on the touch panel. The touch sensor may not only sense a boundary of a touch or swipe action, but also detect a wake-up time and pressure associated with the touch or slide action. In some embodiments, the multimedia component 1108 includes a front-facing camera and/or a rear-facing camera. When the communication device 1100 is in an operation mode, such as a photographing mode or a video mode, the front-facing camera and/or the rear-facing camera may receive external multimedia data. Each front-facing camera and the rear-facing camera may be a fixed optical lens system or have a focal length and an optical zoom capability.

The audio component 1110 is configured to output and/or input an audio signal. For example, the audio component 1110 includes a microphone (MIC) configured to receive an external audio signal when the communication device 1100 is in an operating mode, such as a call mode, a recording mode, and a speech recognition mode. The received audio signal may be further stored in the memory 1104 or transmitted via the communication component 1116. In some embodiments, the audio component 1110 further includes a speaker configured to output an audio signal.

The I/O interface 1112 provides an interface between the processing component 1102 and a peripheral interface module, and the peripheral interface module may be a keyboard, a click wheel, a button, or the like. These buttons may include, but are not limited to, a home button, a volume button, a start button, and a lock button.

The sensor component 1114 includes at least one sensor for providing status assessments of various aspects for the communication device 1100. For example, the sensor component 1114 may detect the on/off state of the device 1100, the relative positioning of the components, such as the display and the keypad of the communication device 1100. The sensor component 1114 may also detect changes in the location of the communication device 1100 or one component of the communication device 1100, the presence or absence of the user in contact with the communication device 1100, the orientation or acceleration/deceleration of the communication device 1100, and the temperature change of the communication device 1100. The sensor component 1114 may include a proximity sensor configured to detect the presence of nearby objects without any physical contact. The sensor component 1114 may also include a light sensor, such as a CMOS or CCD image sensor, for use in an imaging application. In some embodiments, the sensor component 1114 may further include an acceleration sensor, a gyroscope sensor, a magnetic sensor, a pressure sensor, or a temperature sensor.

The communication component 1116 is configured to facilitate wired or wireless communication between the communication device 1100 and other devices. The communication device 1100 may access a wireless network based on a communication standard, such as WiFi, 2G, or 3G, or a combination of them. In one example embodiment, the communication component 1116 receives broadcast signals or broadcast related information from an external broadcast management system via a broadcasting channel. In one example embodiment, the communication component 1116 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example embodiment, the communication device 1100 may be implemented by at least one application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components for performing the above method.

In an example embodiment, there is further provided a non-transitory computer-readable storage medium including instructions, for example, a memory 1104 including instructions, which may be executed by the processor 1120 of the communication device 1100 to complete the foregoing method. For example, the non-transitory computer-readable storage medium may be a ROM, a random access memory (RAM), a CD-ROM, a magnetic tape, a floppy disk, an optical data storage device, etc.

Figure 12:
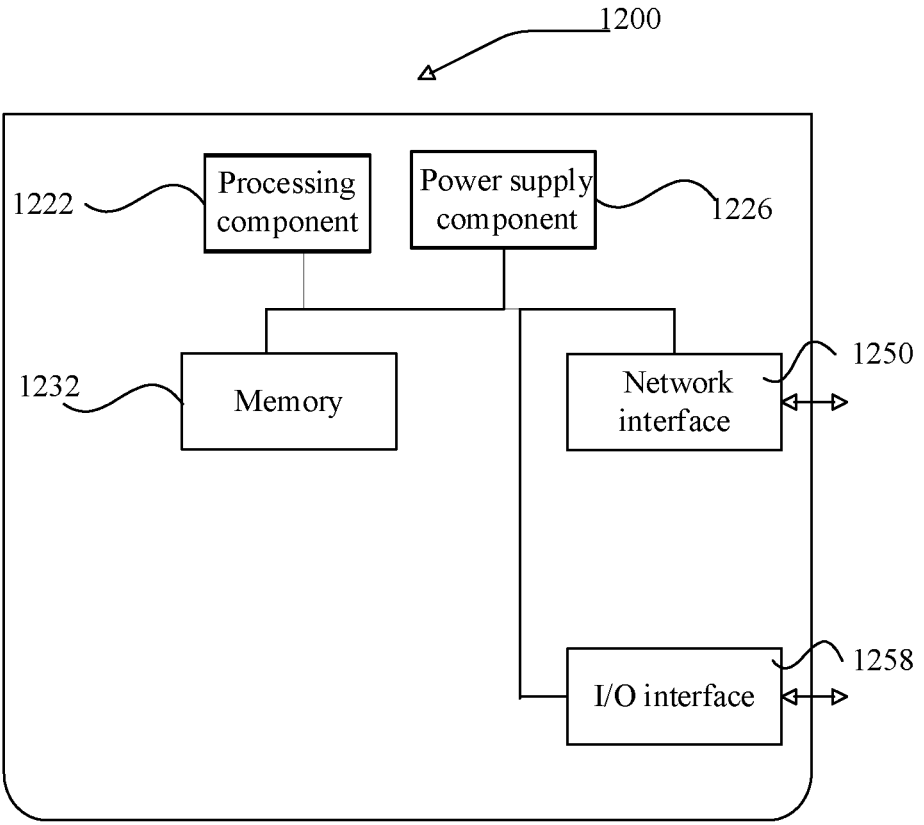
FIG. 12 is a second schematic structural diagram of a communication device according to some embodiments of the present disclosure.

As shown in FIG. 12, an embodiment of the present disclosure illustrates a structure of another communication device. The communication device may be a base station according to some embodiments of the present disclosure. For example, the communication device 1200 may be provided as a network device. Referring to FIG. 12, the communication device 1200 includes a processing component 1222, which further includes at least one processor, and a memory resource represented by the memory 1232 for storing instructions executable by the processing component 1222, such as an application. The application stored in the memory 1232 may include one or more modules each corresponding to a set of instructions. In addition, the processing component 1222 is configured to execute an instruction, so as to execute the above method and any method applied to the communication device.

The communication device 1200 may also include a power supply component 1226 configured to perform power management of the communication device 1200, one wired or wireless network interface 1250 configured to connect the communication device 1200 to a network, and an input/output (I/O) interface 1258. The communication device 1200 may operate an operating system based on stored in the memory 1232, such as Windows Server™, Mac OS X™, Unix™, Linux™, FreeBSD™, or the like.

According to a first aspect of the embodiments of the present disclosure, there is provided a method for power control, including: receiving, by a base station, indication information sent by a terminal based on a P-MPR (Maximum Allowed UE Output Power Reduction); and determining control information for regulating and controlling uplink transmission of the terminal according to the indication information.

In some embodiments, determining the control information for regulating and controlling the uplink transmission of the terminal according to the indication information includes: determining a relationship between the P-MPR of the terminal and a first threshold of the P-MPR according to the indication information; and determining the control information for regulating and controlling the uplink transmission of the terminal according to the relationship between the P-MPR of the terminal and the first threshold.

In some embodiments, the method further includes: issuing the first threshold of the P-MPR; and receiving the indication information sent by the terminal based on the P-MPR includes: receiving the indication information sent by the terminal based on the P-MPR and the first threshold.

In some embodiments, issuing the first threshold of the P-MPR includes at least one of: issuing the first threshold of the P-MPR through broadcasting; or issuing radio resource control (RRC) signaling carrying the first threshold of the P-MPR.

In some embodiments, the indication information includes at least one of: first indication information indicating that the P-MPR of the terminal is greater than the first threshold; second indication information indicating that the P-MPR of the terminal is less than or equal to the first threshold; a difference between the P-MPR of the terminal and the first threshold; or a difference range that the difference between the P-MPR of the terminal and the first threshold belongs to.

In some embodiments, receiving the indication information sent by the terminal based on the P-MPR includes at least one of: receiving RRC signaling carrying the indication information; or receiving a power headroom report (PHR) carrying the indication information.

In some embodiments, the control information includes at least one of: a scheduling instruction for specifying an uplink duty cycle; a second threshold of a signal-to-noise ratio of the uplink transmission; or a third threshold of a received power of the uplink transmission.

In some embodiments, the method further includes: receiving capability information for regulating and controlling a specific absorption rate (SAR) sent by the terminal; and determining the control information for regulating and controlling the uplink transmission of the terminal according to the indication information including: determining to regulate and control the control information according to the indication information and the capability information.

In some embodiments, determining to regulate and control the control information according to the indication information and the capability information includes at least one of: determining that the capability information indicates that the terminal has a capability of regulating and controlling the SAR, and determining the second threshold of the signal-to-noise ratio or the third threshold of the received power of the uplink transmission according to the indication information; determining that the capability information indicates that the terminal has the capability of regulating and controlling the SAR and the signal-to-noise ratio of the uplink transmission being lower than the second threshold, issuing the scheduling instruction for specifying the uplink duty cycle according to the indication information; where the scheduling instruction is used for reducing the uplink duty cycle of the terminal; determining that the capability information indicates that the terminal has the capability of regulating and controlling the SAR and the received power of the uplink transmission being lower than the third threshold, and issuing the scheduling instruction for specifying the uplink duty cycle according to the indication information; or determining that the capability information indicates that the terminal has no capability of regulating and controlling the SAR, and issuing the scheduling instruction for specifying the uplink duty cycle according to the indication information.

According to a second aspect of the embodiments of the present disclosure, there is provided a method for power control, including: sending, by a terminal, indication information according to a P-MPR of the terminal; and performing uplink transmission according to control information determined by a base station based on the indication information for regulating and controlling the uplink transmission of the terminal.

In some embodiments, the method further includes: receiving a first threshold of the P-MPR issued by the base station; and sending the indication information according to the P-MPR of the terminal includes: sending the indication information according to the P-MPR of the terminal and the first threshold.

In some embodiments, sending the indication information according to the P-MPR of the terminal and the first threshold includes at least one of: sending the indication information by determining that the P-MPR of the terminal is greater than the first threshold; or sending the indication information by determining that the P-MPR of the terminal is greater than the first threshold, a maximum power reduction (MPR) of the terminal, and an additional maximum power reduction (A-MPR) of the terminal.

In some embodiments, receiving the first threshold of the P-MPR issued by the base station includes at least one of: receiving the first threshold of the P-MPR broadcasted by the base station; or receiving RRC signaling carrying the first threshold of the P-MPR issued by the base station.

In some embodiments, the indication information includes at least one of: first indication information indicating that the P-MPR of the terminal is greater than the first threshold; second indication information indicating that the P-MPR of the terminal is less than or equal to the first threshold; a difference between the P-MPR of the terminal and the first threshold; or a difference range that the difference between the P-MPR of the terminal and the first threshold belongs to.

In some embodiments, sending the indication information according to the P-MPR of the terminal includes at least one of: sending RRC signaling carrying the indication information according to the P-MPR of the terminal; or sending a PHR carrying the indication information according to the P-MPR of the terminal.

In some embodiments, the method further includes: sending capability information of the terminal for regulating and controlling an SAR; and performing the uplink transmission according to the control information determined by the base station based on the indication information for regulating and controlling the uplink transmission of the terminal includes: performing the uplink transmission according to the control information determined by the base station based on the indication information and the capability information for regulating and controlling the uplink transmission of the terminal.

In some embodiments, the control information includes at least one of: a scheduling instruction specifying an uplink duty cycle; a second threshold of a signal-to-noise ratio of the uplink transmission; or a third threshold of a received power of the uplink transmission.

In some embodiments, the method further includes: receiving the scheduling instruction issued by the base station based on the indication information; and performing the uplink transmission according to the control information determined by the base station based on the indication information for regulating and controlling the uplink transmission of the terminal includes: performing the uplink transmission according to the uplink duty cycle determined by the scheduling instruction.

According to a third aspect of the embodiments of the present disclosure, there is provided an apparatus for power control, where the apparatus is applied to a base station and includes: a first receiving module, configured to receive indication information sent by a terminal based on a P-MPR; and a first determination module, configured to determine control information for regulating and controlling uplink transmission of the terminal according to the indication information.

According to a fourth aspect of the embodiments of the present disclosure, there is provided an apparatus for power control, where the apparatus is applied to a terminal, and includes: a first sending module, configured to send indication information according to a P-MPR of the terminal; a transmission module, configured to perform uplink transmission according to control information determined by a base station based on the indication information for regulating and controlling the uplink transmission of the terminal.

According to a fifth aspect of the embodiments of the present disclosure, there is provided a communication device, and the communication device at least includes a processor, and a memory for storing an executable instruction capable of running on the processor, where, when the processor is configured to run the executable instruction, the executable instruction executes the steps in any one of the methods for power control described above.

According to a sixth aspect of the embodiments of the present disclosure, there is provided a non-transitory computer-readable storage medium, where a computer-executable instruction is stored in the computer-readable storage medium, and when the computer-executable instruction is executed by a processor, the steps in any one of the methods for power control described above are implemented.

Embodiments of the present disclosure provide a method and apparatus for power control, a communication device, and a storage medium. According to the technical solution of the embodiments of the present disclosure, the base station can perform regulation and control of uplink transmission based on the P-MPR of the terminal, so that on one hand, the adjustment capability of the terminal on electromagnetic radiation is satisfied, and the influence of uplink transmission on human health is reduced; and on the other hand, the signal-to-noise ratio requirement of the communication link is satisfied as much as possible, and the security performance of the communication and the communication quality are balanced. That is, the possibility of communication link failure may be reduced as much as possible on the premise of satisfying the security requirement for electromagnetic radiation.

Other embodiments of the present disclosure will be apparent to those skilled in the art from consideration of the description and practice of the present disclosure. The present disclosure is intended to cover any variations, uses, or adaptations of the present disclosure following the general principles of the present disclosure and including common general knowledge or conventional technical means in the art not disclosed in the present disclosure. The description and examples be considered as examples only, and the true scope and spirit of the present disclosure are indicated by the following claims.

It should be understood that the present disclosure is not limited to the exact construction that has been described above and illustrated in the accompanying drawings, and that various modifications and changes may be made without departing from its scope. The scope of the present disclosure is limited only by the accompanying claims.

What is claimed is:

1. A method for power control, wherein the method comprises:
   receiving, by a base station, indication information sent by a terminal based on a maximum allowable power reduction (P-MPR);

receiving capability information for regulating and controlling a specific absorption rate (SAR) sent by the terminal; and determining control information for regulating and controlling uplink transmission of the terminal according to the indication information, wherein the control information comprises at least one of: a scheduling instruction for specifying an uplink duty cycle, a second threshold of a signal-to-noise ratio of the uplink transmission, or a third threshold of a received power of the uplink transmission;

wherein determining the control information for regulating and controlling the uplink transmission of the terminal according to the indication information comprises at least one of:

determining that the capability information indicates that the terminal has a capability of regulating and controlling the SAR, and determining the second threshold of the signal-to-noise ratio or the third threshold of the received power of the uplink transmission according to the indication information;

determining that the capability information indicates that the terminal has the capability of regulating and controlling the SAR and the signal-to-noise ratio of the uplink transmission being lower than the second threshold, issuing the scheduling instruction for specifying the uplink duty cycle according to the indication information; wherein the scheduling instruction is used for reducing the uplink duty cycle of the terminal;

determining that the capability information indicates that the terminal has the capability of regulating and controlling the SAR and the received power of the uplink transmission being lower than the third threshold, and issuing the scheduling instruction for specifying the uplink duty cycle according to the indication information; or determining that the capability information indicates that the terminal has no capability of regulating and controlling the SAR, and issuing the scheduling instruction for specifying the uplink duty cycle according to the indication information.

2. The method according to claim 1, wherein determining the control information for regulating and controlling the uplink transmission of the terminal according to the indication information further comprises:

determining a relationship between the P-MPR of the terminal and a first threshold of the P-MPR according to the indication information; and determining the control information for regulating and controlling the uplink transmission of the terminal according to the relationship between the P-MPR of the terminal and the first threshold.

3. The method according to claim 2, wherein the method further comprises:

issuing the first threshold of the P-MPR; and receiving the indication information sent by the terminal based on the P-MPR comprises:

receiving the indication information sent by the terminal based on the P-MPR and the first threshold.

4. The method according to claim 3, wherein issuing the first threshold of the P-MPR comprises at least one of:

issuing the first threshold of the P-MPR through broadcasting; or issuing radio resource control (RRC) signaling carrying the first threshold of the P-MPR.

5. The method according to claim 3, wherein the indication information comprises at least one of:

first indication information indicating that the P-MPR of the terminal is greater than the first threshold;

second indication information indicating that the P-MPR of the terminal is less than or equal to the first threshold;

a difference between the P-MPR of the terminal and the first threshold; or a difference range that the difference between the P-MPR of the terminal and the first threshold belongs to.

6. The method according to claim 1, wherein receiving the indication information sent by the terminal based on the P-MPR comprises at least one of:

receiving RRC signaling carrying the indication information; or receiving a power headroom report (PHR) carrying the indication information.

7. A method for power control, wherein the method comprises:

sending, by a terminal, indication information according to a P-MPR of the terminal; sending capability information of the terminal for regulating and controlling an SAR; and performing uplink transmission according to control information determined by a base station based on the indication information for regulating and controlling the uplink transmission of the terminal, wherein the control information comprises at least one of: a scheduling instruction specifying an uplink duty cycle, a second threshold of a signal-to-noise ratio of the uplink transmission, or a third threshold of a received power of the uplink transmission;

and wherein the control information is determined by the base station through at least one of:

determining that the capability information indicates that the terminal has a capability of regulating and controlling the SAR, and determining the second threshold of the signal-to-noise ratio or the third threshold of the received power of the uplink transmission according to the indication information;

determining that the capability information indicates that the terminal has the capability of regulating and controlling the SAR and the signal-to-noise ratio of the uplink transmission being lower than the second threshold, issuing the scheduling instruction for specifying the uplink duty cycle according to the indication information; wherein the scheduling instruction is used for reducing the uplink duty cycle of the terminal;

determining that the capability information indicates that the terminal has the capability of regulating and controlling the SAR and the received power of the uplink transmission being lower than the third threshold, and issuing the scheduling instruction for specifying the uplink duty cycle according to the indication information; or determining that the capability information indicates that the terminal has no capability of regulating and controlling the SAR, and issuing the scheduling instruction for specifying the uplink duty cycle according to the indication information.

8. The method according to claim 7, wherein the method further comprises:

receiving a first threshold of the P-MPR issued by the base station; and sending the indication information according to the P-MPR of the terminal comprises:

sending the indication information according to the P-MPR of the terminal and the first threshold.

9. The method according to claim 8, wherein sending the indication information according to the P-MPR of the terminal and the first threshold comprises at least one of:

sending the indication information by determining that the P-MPR of the terminal is greater than the first threshold; or sending the indication information by determining that the P-MPR of the terminal is greater than the first threshold, a maximum power reduction (MPR) of the terminal, and an additional maximum power reduction (A-MPR) of the terminal.

10. The method according to claim 8, wherein receiving the first threshold of the P-MPR issued by the base station comprises at least one of:

receiving the first threshold of the P-MPR broadcasted by the base station; or receiving RRC signaling carrying the first threshold of the P-MPR issued by the base station.

11. The method according to claim 8, wherein the indication information comprises at least one of:

first indication information indicating that the P-MPR of the terminal is greater than the first threshold;

second indication information indicating that the P-MPR of the terminal is less than or equal to the first threshold;

a difference between the P-MPR of the terminal and the first threshold; or a difference range that the difference between the P-MPR of the terminal and the first threshold belongs to.

12. The method according to claim 7, wherein sending the indication information according to the P-MPR of the terminal comprises at least one of:

sending RRC signaling carrying the indication information according to the P-MPR of the terminal; or sending a PHR carrying the indication information according to the P-MPR of the terminal.

13. The method according to claim 7, wherein performing the uplink transmission according to the control information determined by the base station based on the indication information for regulating and controlling the uplink transmission of the terminal comprises:

performing the uplink transmission according to the control information determined by the base station based on the indication information and the capability information for regulating and controlling the uplink transmission of the terminal.

14. The method according to claim 7, wherein the method further comprises:

receiving the scheduling instruction issued by the base station based on the indication information; and performing the uplink transmission according to the control information determined by the base station based on the indication information for regulating and controlling the uplink transmission of the terminal comprises:

performing the uplink transmission according to the uplink duty cycle determined by the scheduling instruction.

15. A communication device, wherein the communication device at least comprises a processor, and a memory for storing an executable instruction capable of running on the processor, wherein:

when the processor is configured to run the executable instruction, to cause the communication device to:

receive indication information sent by a terminal based on a maximum allowable power reduction (P-MPR);

receive capability information for regulating and controlling a specific absorption rate (SAR) sent by the terminal; and determine control information for regulating and controlling uplink transmission of the terminal according to the indication information, wherein the control information comprises at least one of: a scheduling instruction for specifying an uplink duty cycle, a second threshold of a signal-to-noise ratio of the uplink transmission, or a third threshold of a received power of the uplink transmission;

and the communication device is further caused to perform at least one of:

determining that the capability information indicates that the terminal has a capability of regulating and controlling the SAR, and determining the second threshold of the signal-to-noise ratio or the third threshold of the received power of the uplink transmission according to the indication information;

determining that the capability information indicates that the terminal has the capability of regulating and controlling the SAR and the signal-to-noise ratio of the uplink transmission being lower than the second threshold, issuing the scheduling instruction for specifying the uplink duty cycle according to the indication information; wherein the scheduling instruction is used for reducing the uplink duty cycle of the terminal;

determining that the capability information indicates that the terminal has the capability of regulating and controlling the SAR and the received power of the uplink transmission being lower than the third threshold, and issuing the scheduling instruction for specifying the uplink duty cycle according to the indication information; or determining that the capability information indicates that the terminal has no capability of regulating and controlling the SAR, and issuing the scheduling instruction for specifying the uplink duty cycle according to the indication information.

16. A communication device, wherein the communication device at least comprises a processor, and a memory for storing an executable instruction capable of running on the processor, wherein:

when the processor is configured to run the executable instruction, the executable instruction execute steps in the method for power control according to claim 7.

* * * * *